Figure 2:
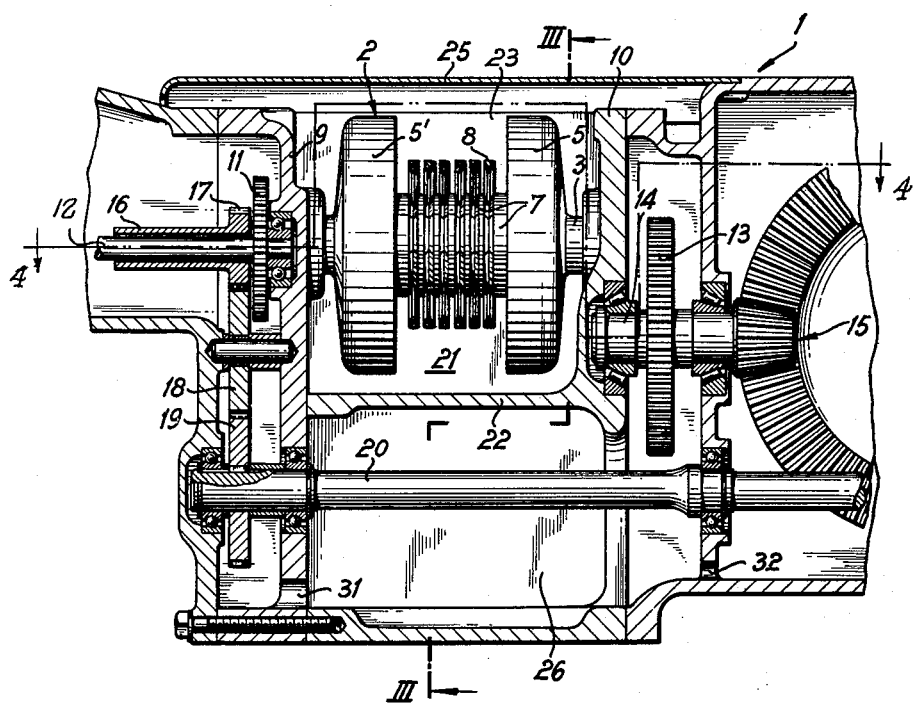

Nov. 6, 1962 H. HOENICK ET AL 3,062,060
TRANSMISSION FOR VEHICLES
Filed May 10, 1960 3 Sheets-Sheet 1
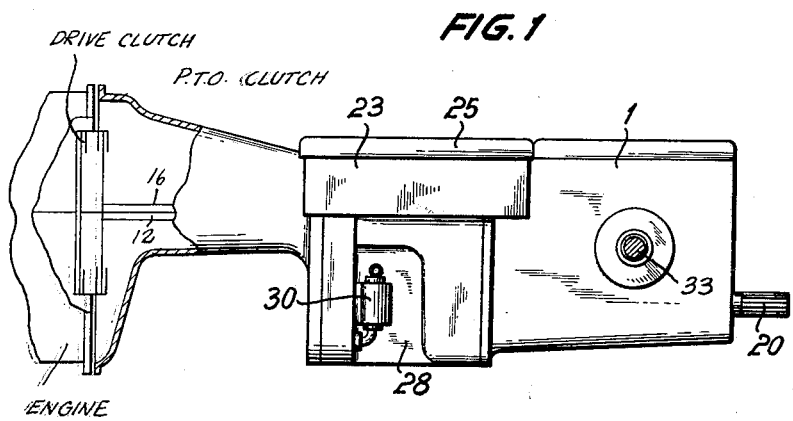
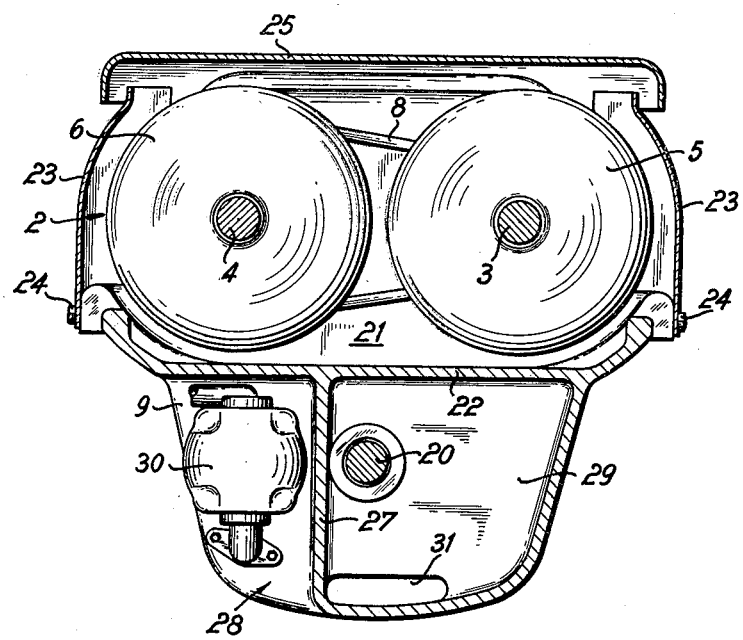
INVENTORS:
Hans HOENICK
Klaus GREWING
BY Dicke, Craig & Freudenberg
ATTORNEYS Nov. 6, 1962 H. HOENICK ET AL 3,062,060
TRANSMISSION FOR VEHICLES
Filed May 10, 1960 3 Sheets-Sheet 2

INVENTORS:
Hans HOENICK
Klaus GREWING

BY Dicke, Craig & Freudenberg
ATTORNEYS

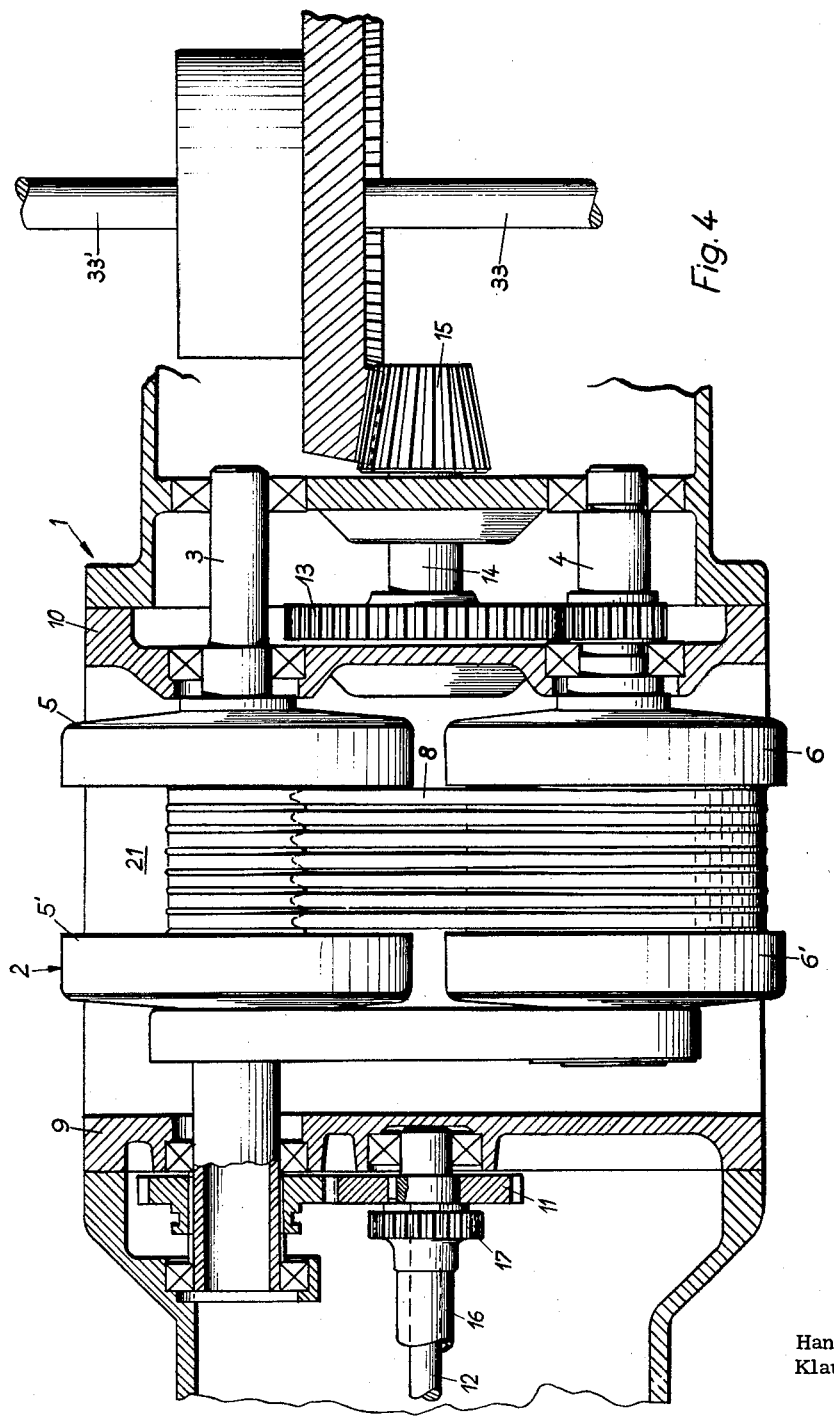

United States Patent Office 3,062,060
Patented Nov. 6, 1962

3,062,060
TRANSMISSION FOR VEHICLES
Hans Hoenick, Stuttgart-Zuffenhausen, and Klaus Grewing, Marbach (Neckar), Germany, assignors to Firma Dr. Ing. h.c. F. Porsche K.G., Stuttgart-Zuffenhausen, Germany
Filed May 10, 1960, Ser. No. 28,102
Claims priority, application Germany May 27, 1959
5 Claims. (Cl. 74—15.84)

The present invention relates to a transmission for a vehicle, especially for a motor vehicle provided with a V-belt transmission adapted to be adjusted in a continuously variable or stepless manner and arranged between the internal combustion engine and the wheel drive as well as with a shafting arrangement for auxiliary aggregates or apparatus adapted to be driven independently of the transmission.

In the known vehicle transmissions of the type mentioned herein above, the V-belt transmission as well as the shafting is accommodated in a common chamber. In order to obtain an even transmission of torque, the drive or V-belts have to be protected against contact thereof with oil, fat or the like so that special sealing problems arise in connection with such transmissions.

Further difficulties result, with such devices, in particular, in that case when gear drives, for example, for the drive of the shafting arrangement serving as take-off shaft which is independent of the transmission and a counter-shaft for the transmission of the vehicle driving torque are provided at the input as well as at the output side of the V-belt transmission. For that purpose, oil lines or conduits between the individual chambers of the transmission have to be arranged for purposes of connecting the spatially separated gear drives, which oil lines extend through the chamber of the V-belt transmission. The manufacturing cost of such a construction is not only excessively high but there exists the danger when the oil lines become leaky that leakage oil soils the belts and therewith the transmission is no longer capable of transmitting the required torque.

These disadvantages are avoided according to the present invention by arranging the V-belt transmission on one side and the shafting on the other side of a separating wall dividing the transmission housing. By the use of such an arrangement not only a separation between the part of the transmission to be lubricated and the V-belt transmission is realized in a simple and inexpensive manner but at the same time a connection between the chambers for the passage of oil is simultaneously created thereby. Especially the arrangement in which the V-belt transmission is accommodated above and the shafting below a horizontal separating wall subdividing the transmission housing, entails the advantage that the V-belt transmission is removed completely out of the area of the lubricating oil since the lubricating oil flows below the V-belt transmission. A location of the V-belt transmission which is particularly favorable for the installation thereof may be obtained if the drive and driven shaft thereof extend in a common horizontal plane.

The housing for the arrangement of the V-belt transmission in accordance with the present invention is provided for the accommodation of the V-belt transmission with essentially saddle-shaped recesses open along both sides thereof, the end walls of which are provided with apertures for the accommodation of the driving and driven shaft of the transmission. This construction not only entails a considerable saving in weight of the transmission housing but also permits a ready accessibility to the V-belt transmission. In order to protect the V-belt transmission against external influences, the laterally open recesses of the housing for the V-belt transmission are covered by wall panels preferably arranged so as to be readily detachable.

The housing part disposed below the horizontal separating wall is subdivided into two chambers extending in the longitudinal direction of the housing by means of a vertically extending additional separating wall which are limited or defined by means of cross walls provided with apertures. These chambers may be used for differing purposes, for examples, one of the chambers may be used for the accommodation of the shafting and the other as reservoir for the lubricating or working oil for the power lift in case of a tractor. It is, however, also advantageous if one of the chambers is constructed as a recess open toward the outside thereof which is limited or defined by portions of the horizontal wall, by the separating wall as well as by the transverse wall and which serves for the accommodation of auxiliary aggregates or apparatus of the vehicle, for example, of the pump for the power lift. Of course, other auxiliary apparatus may be arranged within the space which have to be readily accessible for maintenance, service or exchange thereof.

Accordingly, it is an object of the present invention to provide a belt transmission arrangement for motor vehicles which is simple in construction, inexpensive in manufacture and assembly, and which obviates the deficiencies of the prior art constructions.

Another object of the present invention is the provision of a belt transmission which obviates the special problems normally encountered with leakages in the seals thereof, especially insofar as the belts of the belt transmission are concerned.

A still further object of the present invention is the arrangement of a transmission for motor vehicles in which the several transmission arrangements are separated from each other so that the transmission part which does not require lubrication is fully isolated from the transmission part normally requiring lubrication.

Still another object of the present invention resides in the provision of an arrangement for a V-belt transmission, especially for motor vehicles, in which the driving belts are fully protected against soiling from lubricating oil.

A further object of the present invention is a particular appropriate subdivision of a transmission housing so as to provide readily accessible transmission chambers without increasing the cost or weight of the transmission.

These and other objects and advantages of the present invention will become more obvious from the following description, when taken in connection with the accompanying drawing which shows, for purposes of illustration only, one embodiment in accordance with the present invention and wherein FIGURE 1 is a side elevational view of a transmission housing and the surrounding parts thereof in accordance with the present invention, FIGURE 2 is a longitudinal cross-sectional view, on an enlarged scale, through the transmission housing of the present invention, FIGURE 3 is a cross-sectional view, taken along line III—III of FIGURE 2, and FIGURE 4 is an enlarged longitudinal sectional view taken along the line 4—4 of FIGURE 2.

Referring now to the drawing wherein like reference numerals are used to designate corresponding parts, and more particularly to FIGURE 1, the drive takes place from a suitable prime mover, such as an internal combustion engine, through a double clutch of known construction (not shown) to the vehicle transmission and to an auxiliary shaft driven independently of the vehicle transmission for auxiliary aggregates or apparatus. The various transmission parts are thereby accommodated within a multi-partite housing 1 whereby a continuously variable V-belt transmission generally designated by reference numeral 2 is used as the drive transmission.

The V-belt transmission 2 (FIGURE 2) includes two pairs of disc members 5, 5' and 6, 6' (the latter not shown but located analogously to disk member 5') arranged at a distance from each other on a respective shaft 3 and 4 whereby each pair of disk members carries a plurality of radially adjustable sectors 7 for receiving the drive belts 8. The shafts 3 and 4 are thereby supported in a common horizontal plane within bearing walls 9 and 10 provided in the transmission housing. The shaft 3 which serves as drive shaft for the V-belt transmission 2 is driven by means of a pinion 11 (FIGURE 2) which is arranged at the end of shaft 12 facing the transmission 2. The shaft 12 is thereby operatively connected in any suitable manner with the double clutch (not shown).

The transmission of torque from the drive shaft 3 to the shaft 4 of the V-belt transmission 2 which serves as driven shaft by means of driving belts 8 is further transmitted to a gear 13 which is mounted on a drive shaft 14 for the differential gear generally designated by reference numeral 15 (FIGURE 2). The latter gear drives the axle shafts 33, 33' (FIGURES 1 and 4).

An additional hollow shaft 16 surrounding the shaft 12 is simultaneously driven from the double clutch (not shown) which hollow shaft 16 drives over gear 17 and meshing intermediate gear 18, a gear 19 (FIGURE 2) which, in turn, is connected in any suitable manner with the auxiliary shaft 20 for common rotation therewith. The auxiliary shaft 20 thereby serves preferably as take-off shaft for the drive of machines and/or auxiliary aggregates.

The V-belt transmission 2 is shielded against the auxiliary shaft 20 as well as against the gear drive 11, 13, 17, 18 and 19 by means of walls of the transmission housing 1. The V-belt transmission is accommodated within a chamber 21 (FIGURES 2 and 3) which is defined by the supporting walls 9 and 10 as well as by an essentially horizontally extending wall 22 subdividing the housing 1. As clearly visible from FIGURE 3, the chamber 21 is free of any housing wall parts at both transversely extending ends facing in the longitudinal direction thereof and is covered off exclusively by stamped parts or panels 23 which are preferably secured at the housing 1 by means of bolts 24 or the like (FIGURE 3). A further cover plate 25 shields or closes off the chamber 21 on the top thereof.

This kind of accommodation of the V-belt transmission 2 assures not only an unimpaired, unobjectionable and completely satisfactory protection against soiling thereof by transmission oil or the like but is also readily accessible after removal of the stamped parts or panels 23 and 25.

The space 26 disposed below the V-belt transmission 2 is further subdivided by means of an upright, longitudinal wall 27 (FIGURE 3). Of the two chambers 28 and 29 resulting therefrom, one chamber 28 is constructed as a recess open toward the outside along the side thereof. A power-lift pump 30 is arranged within this recess 28, and more particularly on the portion of the supporting wall 9 disposed within that area which pump 30 is thereby accommodated in a protected manner and is nevertheless readily accessible from the outside. The take-off shaft 20 extends through the other chamber 29. This chamber 29 simultaneously serves for connecting the gear transmissions arranged at the input and output side of the V-drive transmission 2 so that the transmission lubricating oil may flow therethrough unimpededly. For that purpose, the supporting and transverse housing walls are possibly provided with corresponding apertures 31 and 32 (FIGURES 2 and 3).

While we have shown and described one embodiment in accordance with the present invention it is understood that the same is not limited thereto but is susceptible of many changes and modifications within the spirit and scope of the present invention. For example, other belt transmission constructions may be used equally effectively, in principle. Moreover, the number of the drive belts used is of no particular significance to the present invention.

Thus, it is quite obvious that the present invention is susceptible of many changes and modifications within the scope of a person skilled in the art, and we, therefore, do not wish to be limited to the details shown and described herein but intend to cover all such modifications and changes thereof as are encompassed by the scope of the appended claims.

We claim:

1. A transmission for vehicles, especially for motor vehicles having an internal combustion engine and wheel drive means, comprising continuously variable belt transmission means and take-off transmission means drivingly connected with said internal combustion engine and adapted to drive auxiliary aggregates independently of said belt transmission means, said belt transmission means being operatively connected between said internal combustion engine and said wheel drive means, and common housing means for both of said transmission means including upwardly extending spaced walls and a separating wall interconnecting said spaced walls, said separating wall extending in a horizontal plane, said belt transmission means being disposed on one side of said separating wall and said take-off transmission means on the other side thereof, said take-off transmission means including a shaft extending substantially throughout the entire extent of said housing means in a direction parallel to said separating wall.

2. A transmission for vehicles according to claim 1, wherein said belt transmission means is disposed above said separating wall and said take-off transmission means below said separating wall.

3. A transmission for vehicles according to claim 1, wherein said housing means includes a further separating wall extending at approximately right angles to said first-mentioned separating wall and subdividing the space disposed on said other side of said first-mentioned separating wall to thereby form two chambers extending essentially in the direction of said second-mentioned separating wall.

4. A transmission for vehicles according to claim 3, wherein said second-mentioned separating wall extends essentially vertically, said belt transmission means being disposed above said take-off transmission means.

5. A transmission for vehicles according to claim 4, further comprising gear means between said internal combustion engine, on the one hand, and said output shaft means and said take-off transmission means, on the other, said gear means being accommodated within said housing means in chambers sealed off against the chamber accommodating said belt transmission means, said chambers being defined by said separating walls.

References Cited in the file of this patent

UNITED STATES PATENTS

| | | |
|---|---|---|
| 2,342,941 | Johnson et al. | Feb. 29, 1944 |
| 2,403,848 | Couse | July 9, 1946 |
| 2,531,818 | Kranick | Nov. 28, 1950 |
| 2,764,247 | Wiegman et al. | Sept. 25, 1956 |
| 2,807,299 | Steinmatz | Sept. 24, 1957 |
| 2,830,628 | Pettigrew et al. | Apr. 15, 1958 |
| 2,877,664 | West | Mar. 17, 1959 |
| 2,884,810 | Chapman | May 5, 1959 |

FOREIGN PATENTS

| | | |
|---|---|---|
| 493,078 | Canada | May 26, 1953 |
| 556,463 | Belgium | Apr. 30, 1957 |